US005980064A

United States Patent [19]

Metroyanis

[11] Patent Number: 5,980,064

[45] Date of Patent: Nov. 9, 1999

[54] ILLUMINATION CELL FOR A VOTIVE LIGHT

[76] Inventor: George T. Metroyanis, 825 W. 61st Ave., Merrillville, Ind. 46410

[21] Appl. No.: 09/184,410

[22] Filed: Nov. 2, 1998

[51] Int. Cl.[6] .......... F21L 7/00

[52] U.S. Cl. .......... 362/194; 362/157; 362/800; 362/810

[58] Field of Search .......... 362/124, 154, 362/157, 194–196, 186, 800, 808, 810

[56] References Cited

U.S. PATENT DOCUMENTS

| | | | |
|---|---|---|---|
| D. 248,411 | 7/1978 | Somple | D99/25 |
| D. 346,038 | 4/1994 | Buttermann | D26/6 |
| D. 347,906 | 6/1994 | Dorick | D26/67 |
| 1,321,091 | 3/1919 | Hellstrand | 362/186 |
| 3,805,050 | 4/1974 | Spiegel | 362/124 |
| 3,836,762 | 9/1974 | Thomason | 362/186 |
| 3,890,085 | 6/1975 | Andeweg | 431/125 |
| 3,942,940 | 3/1976 | O'Shea | 431/291 |
| 4,177,407 | 12/1979 | Goldstein et al. | 315/312 |
| 4,675,578 | 6/1987 | Mitchell et al. | 315/315 |
| 4,866,580 | 9/1989 | Blackerby | 362/810 |
| 5,065,291 | 11/1991 | Frost et al. | 362/183 |
| 5,129,153 | 7/1992 | Burns, Sr. | 33/613 |
| 5,255,170 | 10/1993 | Plamp et al. | 362/183 |
| 5,318,177 | 6/1994 | Isacson | 362/154 |
| 5,404,343 | 4/1995 | Boggio | 369/19 |
| 5,564,816 | 10/1996 | Arcadia et al. | 362/183 |
| 5,683,239 | 11/1997 | Cardosi | 431/291 |

*Primary Examiner*—Alan Cariaso
*Attorney, Agent, or Firm*—Fitch, Even, Tabin & Flannery

[57] ABSTRACT

An electronic votive light suitable for outdoor applications. The electronic votive light may be formed from a standard votive light assembly and an illumination cell with the same form factor as a candle used in a standard votive light in order to enable the illumination cell to be disposed within a standard votive light. The illumination cell in accordance with the present invention includes an LED, powered by a battery pack. The battery pack may consist of 6 standard D-cell battery, which, based on the relatively low power consumption of the LED, are able to keep the LED illuminated for a substantial amount of time, for example one year or more. The illumination cell in accordance with the present invention is formed from corrosion proof and corrosion resistant materials which make the device particularly suitable for outdoor applications.

10 Claims, 4 Drawing Sheets

ILLUMINATION CELL FOR A VOTIVE LIGHT

BACKGROUND OF THE INVENTION

1. Field of the Invention

The present invention relates to an electric votive light and in particular to a corrosion resistant electric votive light suitable for outdoor use.

2. Description of the Prior Art

Votive or vigil lights are known to be used for various purposes in both indoor and outdoor applications. Such votive lights normally include a base or candle holder for receiving a votive candle. An example of indoor votive light is described and illustrated in U.S. Pat. No. 3,942,940. Due to the limited life of votive candles when lit, electronic votive lights for indoor applications have been developed, for example, as disclosed in U.S. Pat. Nos. 3,890,085; 4,177,407; and 4,675,578.

Votive lights are also known to be used in outdoor applications. Both candle and electronic outdoor votive lights are known. An example of an electronic outdoor votive light is disclosed in U.S. Pat. No. D347,906. U.S. Pat. Nos. 5,065,291; 5,255,170; and 5,564,816 disclose other types of electronic illuminated memorials, normally found at cemeteries. In addition U.S. Pat. No. 5,404,343 discloses a cemetery memorial with an audio system. Such outdoor electronic devices utilize solar cells in order to power the illumination or audio assembly within the device. Such solar cell driven devices have several disadvantages. First, such systems rely on capturing sun light and converting it to electrical power for powering the illumination or audio system within the device. Such solar systems can thus only deliver limited amounts of power. Secondly, such solar cell driven devices are only able to produce power on sunny days. As such, traditional votive light assemblies with candles, as generally illustrated in FIG. 1, are typically utilized in outdoor applications, for example, in cemeteries. More particularly, a known votive light, generally identified with the reference numeral 20, includes a generally cylindrical transparent housing 22 closed on both ends by ferrules 24 and 26. A stake 28 is attached to bottom ferrule 26 to allow the votive light assembly 20 to be mounted in the ground. A votive candle 30 is normally inserted within the housing 22. The top ferrule 24 is removable to enable access to the housing 22 for purposes of lighting and/or replacing the candle 30. Such votive light assemblies are available from the Arthur Allen Manufacturing Co. of Elkhorn, Wis. One of the problems with such votive assemblies 20 is that the candle 30 burns out in a relative short time, for example, less than a day. Thus, there is a need for providing a votive light which stays lit for a substantial amount of time and is also corrosion resistant for use in outdoor applications.

SUMMARY OF THE INVENTION

Briefly, the present invention relates to an illumination cell for a votive light suitable for outdoor applications. The illumination cell is formed with the same form factor as a candle in a standard votive light in order to enable the illumination cell to be disposed therewithin. The illumination cell in accordance with the present invention includes an LED powered by a battery pack. The battery pack may consist of 6 standard D-cell battery, which, based on the relatively low power consumption of the LED, are able to keep the LED illuminated for a substantial amount of time, for example one year or more. The illumination cell in accordance with the present invention is formed from corrosion resistant and corrosion proof materials which make the illumination cell particularly suitable for outdoor applications.

DESCRIPTION OF THE DRAWINGS

These and other advantages of the present invention can be readily understood with reference to the following specification and attached drawing wherein.

DETAILED DESCRIPTION

Figure 1:
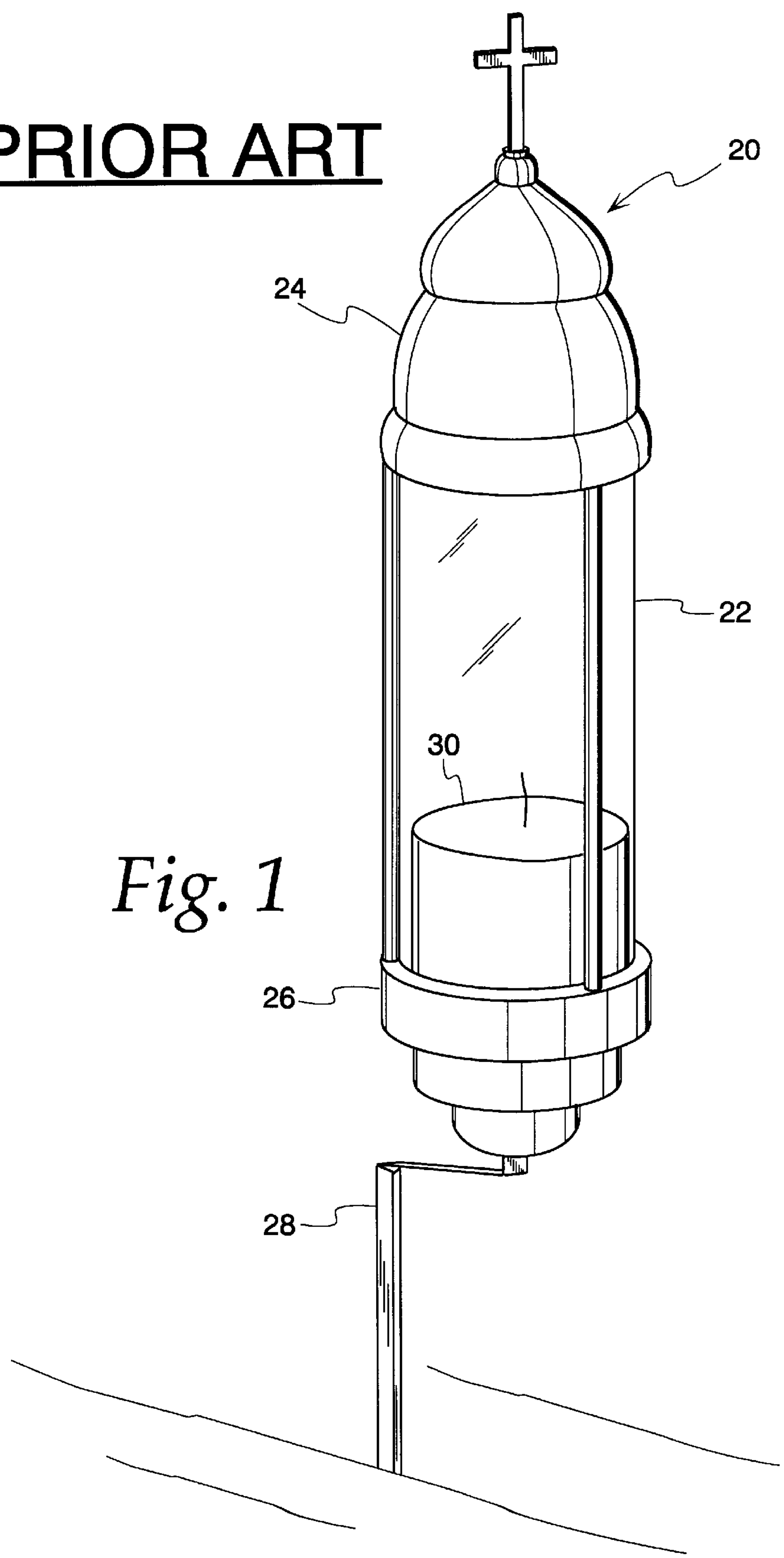
FIG. 1 is a perspective view of a known votive light.

The present invention relates to an illumination cell for use in a standard votive light, such as illustrated in FIG. 1. The illumination cell is formed to the same form factor as the candle in votive light in order be disposed therewithin. The components of the illumination cell are formed from corrosion resistant and corrosion proof materials, making the illumination cell suitable for outdoor use. As will be discussed in more detail below, the illumination cell in accordance with the present invention is powered from a battery pack, which may include, for example, 6 standard type D batteries, which maintain the illumination of the cell for extended periods of time, for example one year or more.

Figure 2:
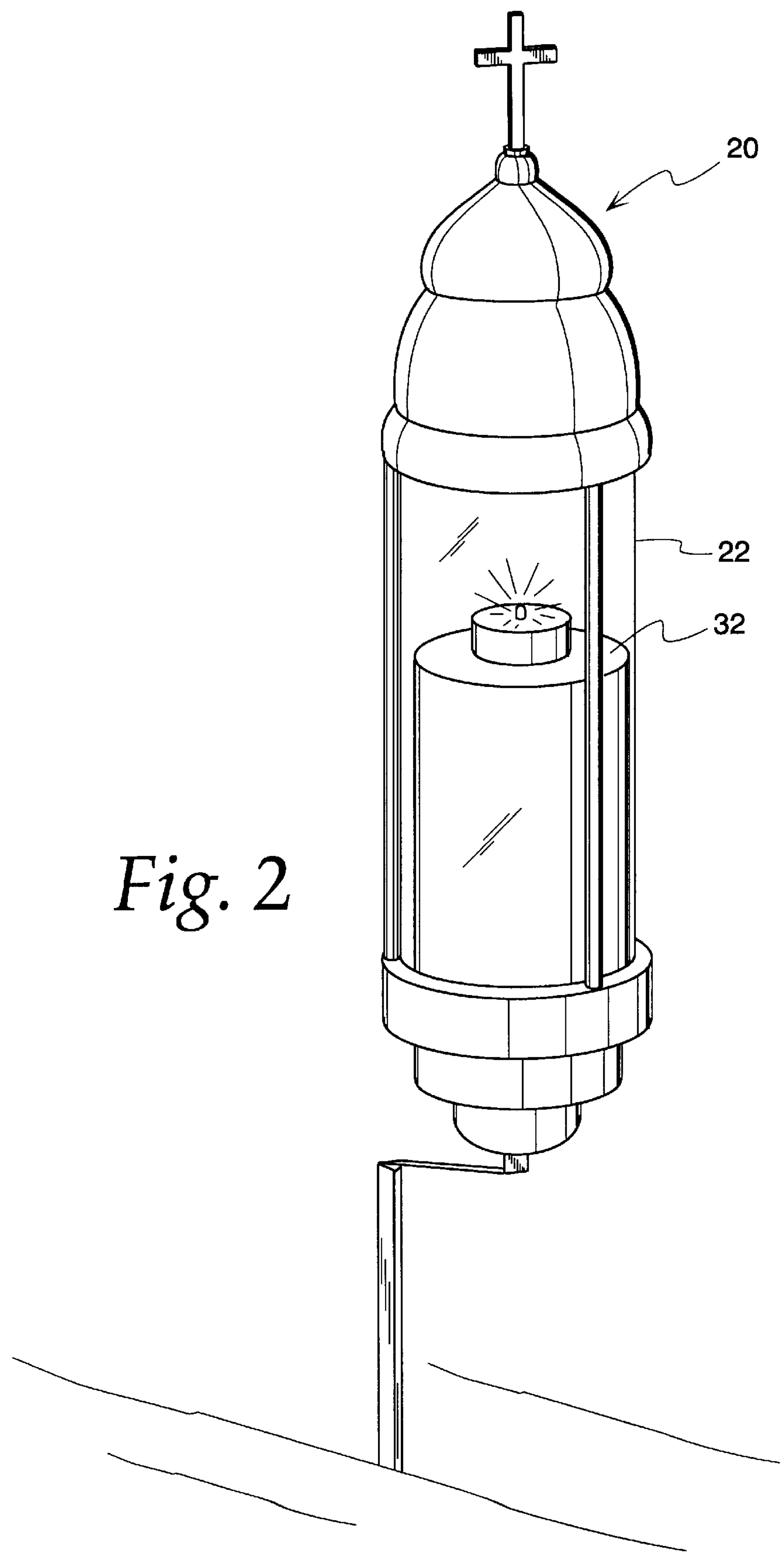
FIG. 2 is a perspective view of a votive light with an illumination cell in accordance with the present invention disposed therein.
Figure 3:
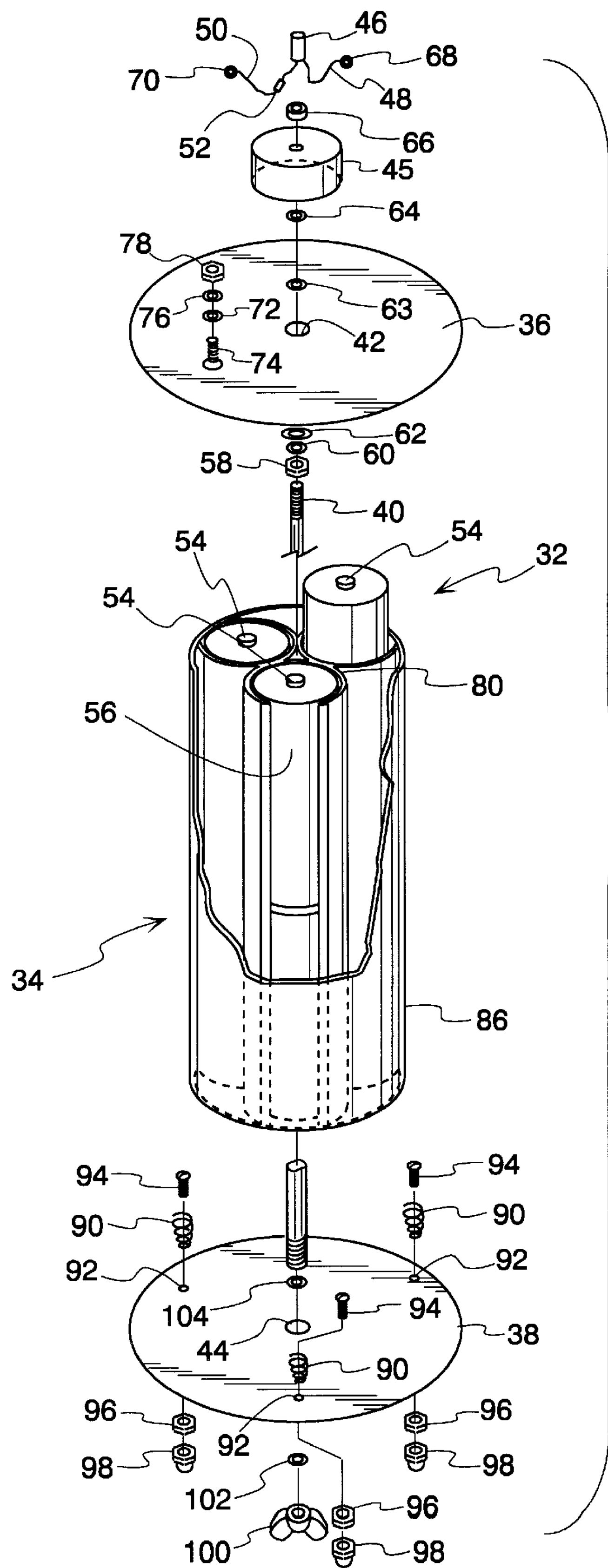
FIG. 3 is an exploded perspective view of the illumination cell in accordance with the present invention.

Referring to FIGS. 2 and 3, the illumination cell in accordance with the present invention is generally identified with the reference numeral 32. As discussed above and shown in FIG. 2, the illumination cell 30 is formed in a generally cylindrical shape with the same general form factor as the candle 30 within the housing 22 of the votive light 20, such that the illumination cell 32 can be disposed therewithin. As shown in FIG. 3, the illumination cell 32 includes a battery pack assembly 34 for housing one or more standard batteries. As illustrated herein and described, the battery pack assembly 34 is formed to carry 6 standard type D batteries. However, the principles of the present invention are applicable to virtually any type of battery pack.

A pair of stainless steel plates 36 and 38 defining top and bottom plates, are used to close the top and bottom of the battery pack 34. As will be discussed in more detail below, the battery pack assembly 34 is adapted to receive an elongated electrically conductive rod 40, for example, made from stainless steel, that is threaded on both ends. The threaded ends of the elongated rod 40 are adapted to be received in apertures 42 and 44, provided in the top and bottom plates 36 and 38, respectively to secure the top and bottom plates 36, 38 relative to the battery pack assembly 34. The rod 40 is also used to secure a cap 45, for example a pop-cap type member, formed from plastic, to the top plate 36 and to provide an electrical connection between the bottom plate 38 and the LED 46. More particularly, the LED, which may be a Mitsubishi type DL 21-RN 30, is provided with two leads 48 and 50. A resistor 52 may be connected in series with one lead 50 to limit the current through the LED 46. The resistor 52 may be, for example, 100 oms, ¼ watt. In order to illuminate the LED 46, one lead 48 must be attached to the top plate 36 while the other lead

50 must be attached to the bottom plate 38; the plates 36 and 38, in turn, being in conductive touch with the positive and negative terminals of the batteries in the battery pack assembly 34. More particularly, the top plate 36, formed of a conductive stainless material, makes touch contact with a positive terminal 54 of one or more batteries 56. The bottom plate 38 is adapted to make touch contact between the negative terminals (not shown) of one or more batteries 56. The LED 52 and particularly leads 48 and 50 are coupled to the positive and negative terminals of the batteries 56. The rod 40, for example, a stainless steel rod, is attached rigidly secured to the bottom of the top plate 36, for example, by way of suitable fasteners, for example, a stainless steel nut 58, stainless steel washer 60 and plastic washer 62. An extending end of the rod 40 is used to securely attach the cap 45 to the top of the top plate 36. In particular, an extending end of the rod 40, after the fasteners 58 through 62 have been secured thereto, is received in the center aperture 42 of the top plate 36. A washer 62, for example, a plastic washer, is received over the extending end of the rod 40. The cap 45 is provided with an aperture (not shown). The rod 40 is received in the aperture and the cap 45. A plastic washer 64 may be received on the extending end of the rod 40. As shown in FIG. 3, the leads 48 to 50 may be provided with ring connectors 68 and 70. One or the other of these ring connectors are attached to an extending portion of the rod 40 and secured thereto by way of nut 66, for example, a stainless steel nut. The other lead 50 by way of its ring connector 70 is securely attached to the top plate 36. More particularly, an aperture 72 is provided in the top plate 36. A fastener, such as a stainless steel screw 74, is inserted in the aperture 72. One of the ring connectors 68 or 70 is slipped over the extending portion of the screw 74 and secured to the top plate 36 by way of a suitable fastener, such as a stainless steel washer 76 and stainless steel knot 78. Once the cap 45 is assembled to the top plate 36 and the connection of the LED 46 are made, the LED is disposed in the cap 45 and secured in place with a conductive material, such as an epoxy. Virtually any conventional means for securing ring connectors 68 and 70 to the rod 40 and the top plate 36, such as, soldering.

The plastic washers 62 and 63 are disposed on both sides of the top plate 36 to provide electrical insulation between the rod 40 and the top plate 36. The aperture 42 is sized to be relatively larger than the diameter of rod 40. It is important that no contact be made between conductive rod 40 and the top plate 36 in order to avoid shorting out the positive and negative battery terminals. Other methods and means other than described and illustrated herein may be used to provide the separation between the conductive rod 40 and the top plate 36, such as a insulating grommet disposed in the aperture 42 of the top plate 36.

Figure 4:
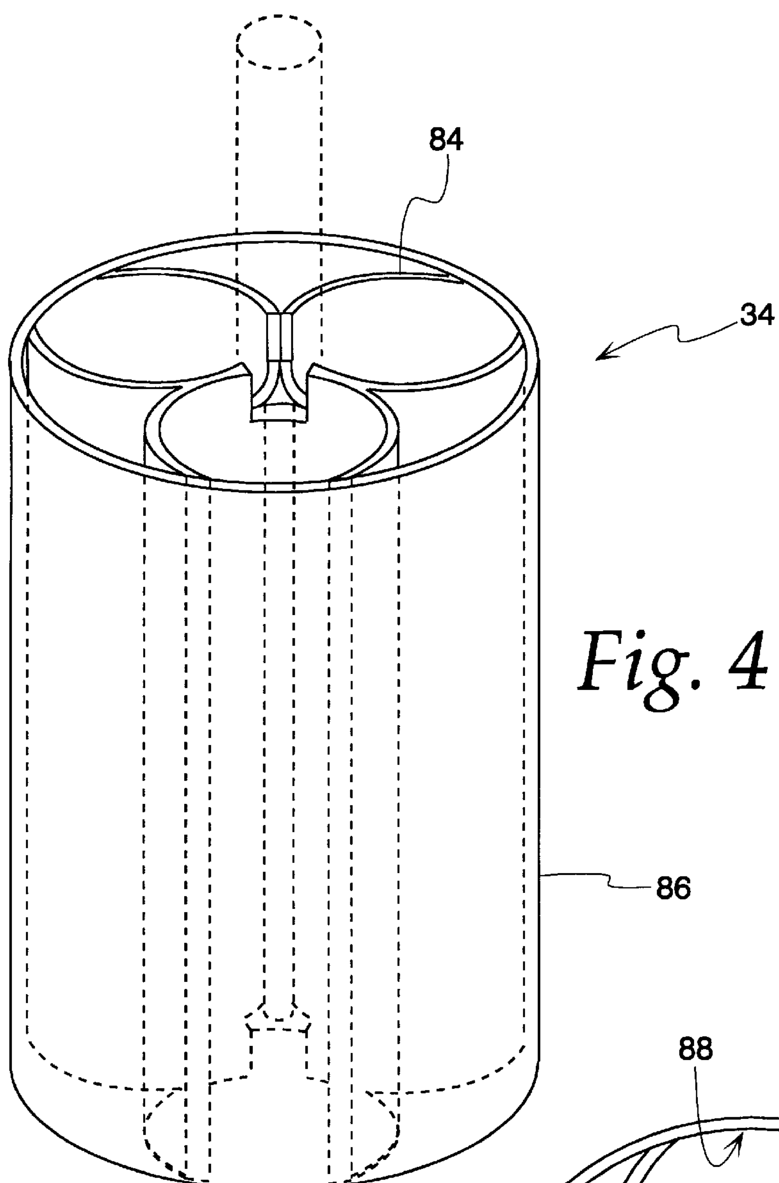
FIG. 4 is a perspective view of a battery housing in accordance with the present invention.
Figure 5:
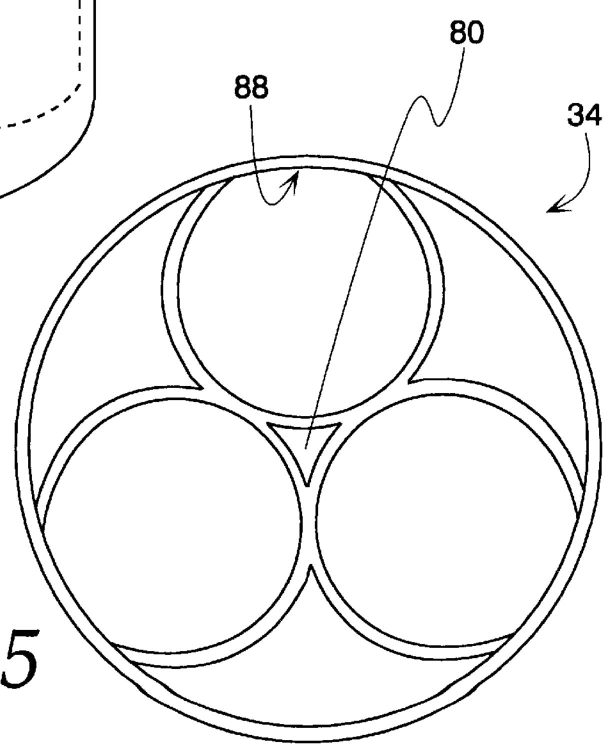
FIG. 5 is a top view of a battery housing illustrated in FIG. 4.

The rod 40 is received in an aperture 80 formed in the battery pack assembly 34. An extending portion of the rod 40 may be used to secure the rod 40 directly to the battery pack assembly 34. In particular, as shown best in FIGS. 4 and 5, the battery pack assembly 34 includes an inner battery housing 84 and an outer housing 86. Both housings 84 and 86 are open on both ends and may be formed from a corrosion proof material such as, plastic. In order to receive a standard D size battery, for example, and provide enough room to fit within the standard vigil light assembly, the battery housing 84 is formed as 3 generally cylindrical tubes joined together forming an aperture 80 therebetween. Each tube is formed with an axial slot or cut-out 88 along its length. The axial slots 86 are closed by the outer housing 86 as best shown in FIG. 5. Alternatively, the votive light housing 22 may be used as the outer housing 86. Alternatively, the 84 and 86 may be dispensed with, in which case, the votive light housing 22 (FIG. 1) forms part of the battery pack assembly 34.

A fastener, such as a non-corrosive nut (not shown) may be used to secure the conductive rod 40 relative to the housing 34. An extending end of the conductive rod 40 may also be used to secure the bottom plate 38 to the battery pack 34 by way of the centrally disposed aperture 44 as best shown in FIG. 3.

In order to provide a relatively good connection between the bottom plate 38 and the negative terminals of the battery 56, the bottom plate 38 may be provided with conductive springs 90. These conductive springs 90 are adapted exert pressure between the bottom plate 38 and the negative terminals of the battery 56. The conductive springs 90 may be rigidly secured to the bottom plate 38 by various conventional means, such as soldering, or with screws and fasteners as shown. For example, a plurality of radially disposed apertures 92 may be formed in the bottom plate 38 for receiving screws 94. The screws 94 are adapted to be received in the apertures 92 and secured to the bottom plate 38 by a plurality of nuts 96. A plurality of acorn nuts 98 may be used to cover an extending portion of the screws 94. The springs 90, the screws 94, nuts 96 and acorn nuts 98 are formed from corrosion resistant materials, such as stainless steel materials.

After the springs 90 are assembled to the bottom plate 38, an extended portion of the rod 40 is received in the central aperture 44 and secured to the bottom plate 38 by a suitable fastener, such as a wing nut 100, with one or more washers 102 and 104. The wing nut 100 as well as a washers 102 and 104 are formed from corrosion resistant materials such as stainless steel or other corrosion resistant materials.

After the illumination cell 32 is fabricated, it is rather easily and simply disposed within the votive light 20 as shown in FIG. 2. The color of the housing 86 may be selected to coincide with the color of the housing 22 of the votive light. In particular, most votive lights are known to be formed with a red transparent housing. The housing 86 may be also be formed with a housing having a similar color but not transparent.

In accordance with the present invention, the illumination cell 32 is adapted to provide illumination within the votive light over a substantially long period of time, such as one year or more. When the lamp burns out, the illumination cell 32 is simple removed. The wing nut 100 is unscrewed in order to remove the bottom plate 38 in order to enable the batteries 56 to be removed. Since all the parts are formed from either corrosion proof materials such as plastic or corrosion resistant materials such as stainless steel materials or other corrosion resistant materials, the illumination cell 32 is not subject to corrosion.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. An illumination cell for use with a votive light, the illumination cell comprising:

a battery pack open on both ends for receiving one or more batteries having positive and negative terminals, the battery pack configured to have generally the same form factor as the votive light in order to be received therewithin, said battery pack formed with an aperture;

a conductive rod adapted to being received in said aperture;

a top plate for closing one end of said battery pack and, for making touch contact with one or the other of said positive or negative battery terminals when said top plate is secured to one of said battery pack, said top plate adapted to be attached to said conductive rod but electrically insulated therefrom;

a bottom plate for closing an opposing end of said battery pack and making touch contact with the other of said positive and negative battery terminals; and an LED connected to said conductive rod and said top plate.

2. The illumination cell as recited in claim 1, wherein said battery pack is formed from a first corrosion proof material.

3. The illumination cell as recited in claim 2, wherein said first corrosion proof material is plastic.

4. The illumination cell as recited in claim 1, wherein said battery pack includes an inner housing and an outer housing.

5. The illumination cell as recited in claim 4, wherein said inner housing is formed from three tubes sized to receive standard D type batteries.

6. The illumination cell as recited in claim 5, wherein each of said tubes is formed with an axial slot.

7. The illumination cell as recited in claim 6, wherein said outer housing closes said axial slots.

8. The illumination cell as recited in claim 2, wherein said top and bottom plates as well as said conductive rod are formed from second corrosion resistant materials.

9. The illumination cell as recited in claim 8, wherein said second corrosion resistant materials includes stainless steel.

10. The illumination cell as recited in claim 1, wherein one or the other of said top plate or bottom plate is removable secured relative to said battery pack.

* * * * *